Aug. 29, 1967     G. CROMPTON     3,339,078
WIND TURBINE ELECTRO-GENERATORS
Filed Dec. 17, 1964
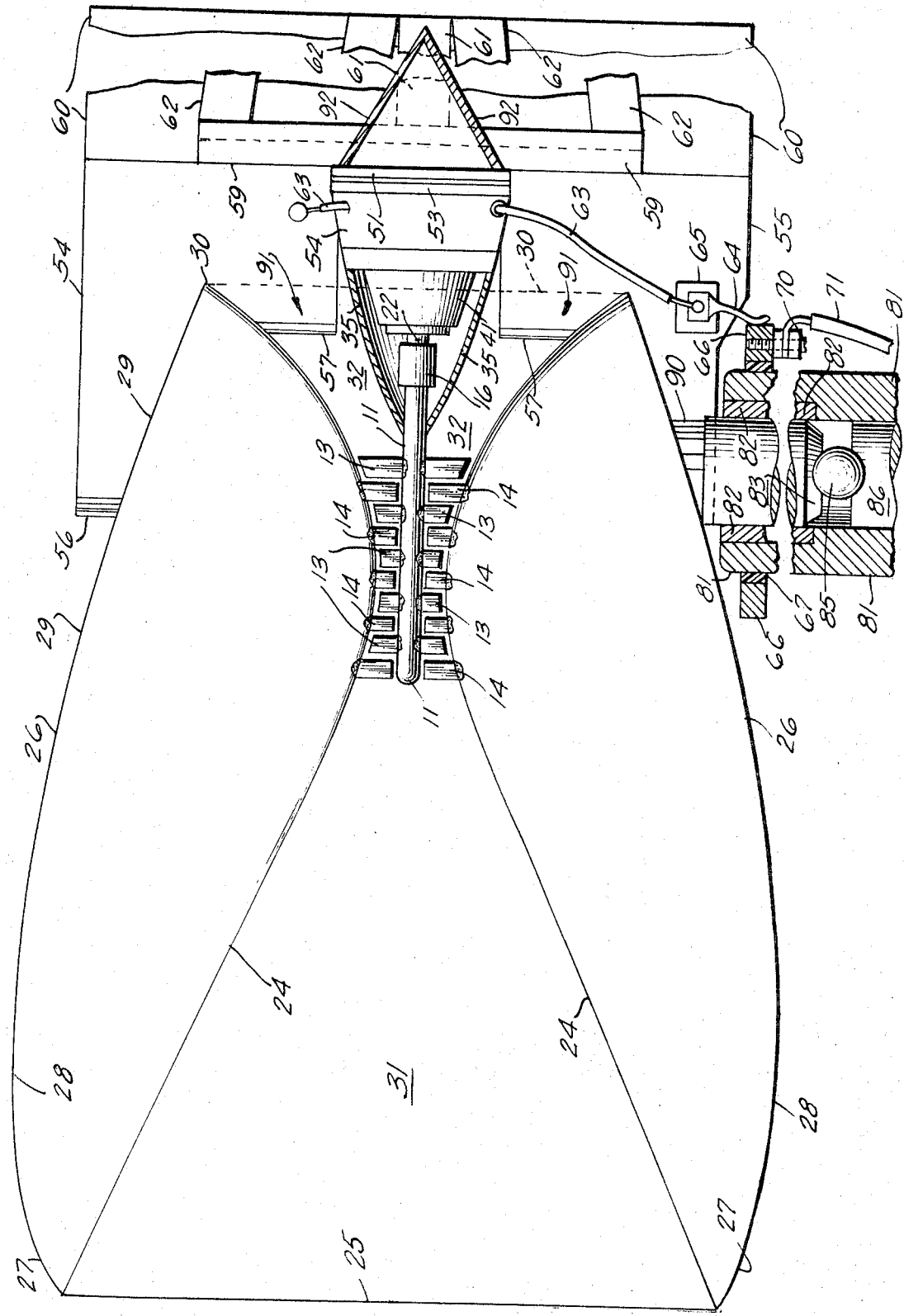

United States Patent Office 3,339,078
Patented Aug. 29, 1967

3,339,078
WIND TURBINE ELECTRO-GENERATORS
George Crompton, 710 Armada Road S.,
Venice, Fla. 33595
Filed Dec. 17, 1964, Ser. No. 419,251
4 Claims. (Cl. 290—44)

ABSTRACT OF THE DISCLOSURE

A body of revolution has an interior in the shape of a Venturi in the throat of which is a turbine which is directly connected by a shaft to a coaxial electric generator. The body is mounted to move in azimuth and is kept headed into the wind by a tail. Electric power is taken from the generator by a ring and brush. The outside of the body is shown as streamlined and is shaped into what is called a negative Venturi and this adds suction to the compression created by the interior Venturi.

---

This invention relates to wind motors and constitutes an air turbine and electro-generator.

One object of the invention is to provide an improved wind motor for my system for generating electricity as disclosed in my copending application Ser. No. 379,409, filed June 30, 1964. Another object is to provide a wind motor seldom needing repairs and needing little attention. Another object is to provide an air turbine ideal for farms and houses on mountains remote from power transmission lines.

Another object of the invention is to provide a noiseless wind turbine. My wind turbine is a wind motor, and so is the old fashioned American windmill, installed on many farms in North America in the 19th century. Some of these are still in use and practically all of them make a great deal of noise, which is objectionable. These windmills are the only wind motors extensively used in the United States up to now. They were almost universally used to pump water.

Another object is to provide a wind motor and aerodynamic means to keep the turbine headed into the wind and having no mechanical drive from the turbine to the base. This eliminates one of the complexities and disadvantages of the American water pumping windmill. I accomplish this object by mounting turbine and generator and tail vane in a single rigid frame structure that is mounted for moving in azimuth on a base or pipe support to meet the changing wind azimuth. Power is transmitted from the generator to the base by a brush and commutator.

Other objects are to provide wind motors having no gearing which yield high r.p.m.—to provide wind motors of high efficiency and/or large power output.

Other objects will be apparent or pointed out hereinafter.

The single figure drawing illustrating one of many possible embodiments of my invention is a vertical, axial sectional view of the turbine and the pipe standard or support, the inner parts and the tail being shown in elevation.

The turbine has an axial shaft 11 to which is secured, as by soldering, rotor blades 13. These rotor blades 13 alternate with stator blades 14. It is well to make the shaft 11 and the blades 13 and 14 out of bronze which is corrosion resistant. The shaft 11 is secured by a coupling 16 to the reduced diameter portion 22 of the shaft of the generator.

The rotor blades 13 are secured, as by soldering, to the outside of the shaft 11. The stator blades 14 are secured, as by soldering, to the inside of a Venturi wind gathering body 24. This is a body of revolution and it will be seen that it has a surface of the second order, so it is desirably made of copper which can be deformed into such a surface. In fact the Indians of Mexico, using a technique known to the Aztecs before they were conquered by Cortez in 1521, make gorgeous bowls of sheet copper out of solid ingots.

The Venturi 24 has a mouth 25 which gathers the wind. I am thinking of dimensions such as one inch on the bristol board equals two feet; in that case the diameter of the mouth 25 is twelve feet with an area of 113 square feet. And yet the generator will not be oversized, having according to the drawing on the above scale a length of about 3.2 feet and a diameter of about 3.13.

Again referring to the drawing, the ratio of the areas of the mouth 25 to the Venturi throat which is deemed to start at the first stator 14 is about forty to one. Thus the generator shaft will revolve at righ speed giving higher E.M.F. and better results all around in my system than in previous wind electro-generators, if any.

The Venturi wind gathering body 24 is completed by a streamlined body 26 which is desirably made of sheet copper because it also has a surface of the second order. It is a body of revolution. It has an aeroplane leading edge 27 as for a wing and after reaching a maximum diameter 28 tapers aft in a portion 29 to meet the body 24 at a circle 30. The Venturi body 24 has an inwardly tapering forward portion 31 and a rearwardly expanding exit portion 32; the shapes shown are my design and many other shapes could be substituted.

To complete the exit portion 32 and to make it streamlined, I provide a conical center 35 also desirably made of sheet copper. I have numbered the visible parts of the generator of my copending application with the same numbers that they have in that application. There is the reduced diameter "top" (of the generator shaft) 22, already referred to, there is the "inverted" taper cup magnetic flux carrying support 41 which can be made of low carbon cast electric steel, as stated. There is the "bottom" plate 51 which in this case I want made of metal (but not a magnetic flux carrying metal) such as brass. Also its diameter need be no greater than shown. There is the end portion 53 of the conical casing 54, both of which should be made of metal such as brass. To the conical casing 54 the conical center 35 is soldered. Where the center 35 almost (or does) touch the shaft 11, there is no bearing. The bearings for the shaft 11 are in or secured to the generator. Bolts, not shown, secure the plate 51 to the end portion 53.

Since winds do not blow continuously from any one quarter, I provide means for heading the mouth 25 into the wind. This might be nothing more than a pivotal mounting for the Venturi 24, 26, 35, the turbine 11, 13 and 14 and the generator 22, 41, 51, 53 and 54, the pivotal mounting permitting free movement of the Venturi, turbine and generator in azimuth and being located forward of aerodynamic center of drag, for example, in line with the mouth 25 and a forwardly extending boom with a slidable weight on it (a rod and a heavy collar) to balance the Venturi, turbine and generator. But I prefer to provide a tail vane or rudder which I shall now describe.

A pair of fairly heavy bronze plates 54 and 55 of shape in elevation as shown and having parallel plane sides, except for rounded streamlined fronts 56 and 57 are soldered to the bodies 24 and 26, and to the conical casing 54, the plate 51 and the end portion 53. Soldered to the rear edges of the plates 54 and 55 is a vertical bar 59 having a vertical slot therein in which fits the tail vane 60 which can be brass sheet and which is soldered in the slot of the bar 59. A horizontal reinforcing bar 61 and a pair of slanted reinforcing bars 62 complete the tail. The bars 61 and 62 can likewise be made of brass and are soldered to the tail vane 60. For strength it is desirable that the vertical bar 59 be soldered also to the plate 51. Throughout what I mean by "soldering" is what is also called welding.

The ends 63 of the generator 41, 54, etc., are shown emerging from it and one end (upper) is freed of insulation and grounded by being soldered to the plate 55. The other end 63 is freed (at its end) of insulation and is soldered to a brush 64 (made of beryllium bronze, for example) that is cemented to an insulating block 65 (made of phenol-formaldehyde resin, for instance) that is cemented to the plate 55.

The brush 64 is in constant contact with the periphery of a ring 66 that is fixed to the periphery of an insulating ring 67, made of plastic such as methyl methacrylate, for example, which can be molded in the ring 66. A binding post 70 is screwed into the ring 66 and to it is connected an insulated cable 71. This is one side of the electrical circuit between the generator 41, 54 and electrical appliances and/or a storage battery or batteries.

The other side of the electrical circuit is a cable, not shown, from said appliances and/or storage battery or batteries to a heavy galvanized steel pipe 81 having a stainless steel inset bearing 82 which receives a bronze journal 83 that is slotted at the top to receive the plate 55 to which it is soldered. This completes the circuit. The bearing 82 is a radial bearing and the journal 83 rests on a steel ball thrust bearing 85 which is supported by a bronze insert 86 driven into the pipe 81.

The axis of the pipe 81 is the same as the axis of the journal 83 and it passes through the center of gravity of the entire movable system comprising the Venturi 24, 26, the turbine 11, 13, 14, the generator 41, 54 and the tail 54, 55, 60, etc. In order to increase the strength of the connection between the journal 83 and the plate 55, I show a taper truncated segment of a cylinder 90 which is soldered to the journal 83 and the plate 55 and naturally there is another one on the other side soldered to the journal 83 and the plate 55.

The pipe 81 may be of any desired height and it is advisable to have it high enough so that the Venturi and the tail shall be above house and tree level. The pipe 81 can be embedded in a concrete block in the ground and braced with steel wires. Or the pipe 81 can be mounted in the attic of a house extending through and above the roof. Ordinarily the pipe 81 will be vertical, but if mounted on a steep incline of a hill or mountain, it had better be inclined to the vertical to be approximately perpendicular to the ground because the wind will follow the ground at least to some extent. What the wind actually does at a given place can be determined by streamers (ribbons).

Assume now a wind velocity of 50 statute miles per hour. The velocity in the Venturi throat will not, because of friction, be forty times fifty; probably of the order of 30×50=1500 statute miles per hour. Now the speed of steam in a steam turbine is said to be of the order of one and a half million miles an hour, which is 1,000 times as fast. Therefore the blading is not necessarily of the same shape as steam turbine blading, but the latter differs in shape a good deal. See volume 22 of the Encyclopaedia Britannica, edition copyrighted 1963, article Turbine: Steam. The blading shown on page 577 is good. Since the velocity of steam is away above Mach 1, there is some justification for having both stator and rotor blades with both leading and trailing edges sharp. But in the Venturi of my air turbine the velocity is most times below Mach 1 (750 statute miles/hour at 30" Hg) and sometimes above it. A twenty-five mile an hour wind equals seven-hundred and fifty m.p.h. in the venturi throat on the basis of my above estimate. But I prefer the greater efficiency with the lighter winds so I choose the blading shapes for stator and rotor blades of page 577, FIG. 4 of said vol. 22 for the best mode of my invention. Better shapes will probably be discovered later. However I would set the pitch at forty degrees to the stream at the entrance and increasing to fifty degrees at the exit end. But this is just an estimate and my claims shall not be limited by anything in this paragraph. Measure pitch on the chord.

It will be observed that the body 26 is itself a Venturi, that is, a negative Venturi. The leading edge 27 expands the wind stream and then the stream contracts to flow along the aft tapering portion 29 and as it does so the air speed increases. This causes a suction which draws the air stream out of the circle 30. The energy taken from the air stream by the turbine slows down the stream but the suction at the circle 30 also imparts energy to the turbine. Furthermore, the annular space 91 forms a secondary or annular Venturi which reduces drag and (relatively) accelerates the air flow in the turbine. The generator is in the ideal position, protected (from drag causing function) by the body 35 and direct close coupled to the turbine. By two slanted (30°) lines 92 I show (in section) a hollow cone astern of the turbine and soldered to the base plate 31. This is not broken away as are the parts 60, 61 and 62 and there is one nearly half hollow cone 92 on each side of the tail. And of course it is a drag reducing tail and could be shaped like the tail of an airship (blimp).

I do not know what is the efficiency of the American windmill. It takes its energy from a circular cross-section of the wind, and the efficiency is the proportion of the available energy that is converted to useful power producing energy. In my air turbine the efficiency is the proportion of the available energy of the wind at the circular cross-section of the orifice 25 or, if you wish, of the maximum diameter 28, which is converted to useful power producing energy input to the generator. The former can't be much above 25% or less, while I expect 80% or more. With the high speed wind turbine herein disclosed, not too many turns would be needed to produce 12 volts E.M.F. at a wind speed of 5 miles an hour. The E.M.F. voltage produced is directly proportional to the number of turns of the armature winding for a given r.p.m. of shafts 11 and 22. Clearly other generators or dynamos can be coupled to my wind turbine or other use may be made of the power produced.

It would be possible and engineeringly practical to build a wind turbine as shown with a mouth 25 of forty feet in diameter. Just omit the tail 60 and mount the plate 55 on a turret operated by gearing and a motor controlled by servo apparatus and a small wind vane anywhere in the vicinity where the wind flows without serious interference by obstructions. For a servo power feed see U.S.P. 2,927,191.

In calculating the horsepower and kilowatts yielded by my wind turbine, I use as parameters normal sea level barometric pressure of 30", 70° F. temperature and a wind speed of 10 feed per second, which is 6 knots, which is 6.8 statute miles per hour. The lowest range of wind speeds on the Beaufort scale, long used by meteorologists, is 0–7 statute miles per hour, light winds.

At 70° F. 30" Hg the density of air is .075 lb. per cu. foot. The mass of air $m$ entering the mouth 25 every second is .075×113 (area of mouth)×10 (altitude of the cylinder of air making up the mass). This mass $m$ is therefore 84.75 lbs.

The equation is $K.E.=½ mv^2$ in which K.E. is kinetic energy and $v$=velocity of wind, i.e. wind speed=10. Therefore $K.E.=½×84.75×10×10=½×8475=4237.5$ foot poundals. To find foot pounds, divide by 32 ($g$) and the answer is 132.4 foot pounds. Every second the wind turbine yields 132.4 foot pounds and 550 foot lbs./sec. is one horsepower. So the turbine yields .24 H.P. with a light wind of 6 knots. This is theoretical, and at an efficiency of 80% the yield is .192 H.P.

I mentioned a wind turbine with a mouth of 40 feet in diameter. This increases the horsepower by the factor of 40×40 divided by 12×12 equals 11.1. So with a forty feet diameter mouth the horsepower is 2.66 theoretical, 2.13 at 80% efficiency. One horsepower, H.P.=746 watts=.746 kilowatts. So the 12 feet diameter wind turbine yields .18 kw. theoretical, .144 kw. at 80% efficiency and the 40 feet diameter wind turbine yields 1.98 kw. theoretical, 1.59 kw. at 80% efficiency. In the above I have assumed a wind speed of 6 knots. At 24 knots this turbine yields 31.68 kw. theoretical, 25.44 kw. at 80% efficiency. Doubling the wind speed quadruples the kw. yield because of the factor $v^2$.

I have stated that the Venturi throat is deemed to start at the first stator blade 14. It is deemed to end at the last rotor blade 13. It is defined as extending from the first forward to the last blade that functions in the turbine.

The shaft 11 is defined as extending into and through the major portion of the throat. It does not have to extend all the way through as it could be cut off at the forward end of the first rotor blades 13.

The Venturi has a longitudinally inwardly (meaning aft) tapering interior forward portion 31 and a longitudinally rearwardly expanding interior exit portion 32. The part 24 is a Venturi body and the part 26 is rigidly connected to the part 29 so together they constitute a Venturi body. Therefore the negative Venturi may be claimed as on the outside of the Venturi body and other claims need not mention the negative Venturi. The edge 27 is annular and so is the inwardly aft tapering portion (surface) 29.

The conical center 35 does not have to be a true cone nor does it have to come to a point at the apex; it can be truncated. As shown it is not a prefect cone and does not come to a point, it would cut off the shaft 11 if it did. It definitely decreases friction by streamlining.

Azimuth is a word well known to naval officers, navigators and astronomers. It means direction without reference to force nor to altitude. The Venturi body moves in azimuth when it swings due to the tail 60 or otherwise. Ring and brush need no explanation.

It will thus be seen that there has been provided by this invention a wind motor, air turbine or wind turbine in which the various objects hereinabove set forth together with many thoroughly practical advantages are successfully achieved. As many possible embodiments can be made of the invention and many changes can be made in the embodiment described herein, it is to be understood that all matter hereinbefore set forth or shown in the drawing is to be interpreted as illustrative and not in a limiting sense.

I claim:

1. An air turbine and electro-generator comprising a Venturi body having a longitudinally inwardly tapering interior forward portion, a longitudinally rearwardly expanding interior exit portion, and a Venturi throat between said portions, a shaft extending into and through the major portion of said Venturi throat, turbine rotor blades on said shaft extending therefrom in said throat, turbine stator blades on said Venturi body extending inwardly in said throat, and an electro-generator outside of said throat coupled to said shaft and structurally rigidly connected to said Venturi body.

2. An air turbine and electro-generator according to claim 1 having on the outside of said Venturi body a negative Venturi comprising an annular aeroplane leading edge and an annular inwardly aft tapering portion merging with the rearwardly expanding interior exit portion.

3. An air turbine and electro-generator according to claim 2 having a conical center in the rearwardly expanding interior exit portion forming a secondary annular Venturi in said exit portion, said conical center aerodynamically protecting the electro-generator from drag causing function.

4. An air turbine and electro-generator according to claim 1 having a conical center in the rearwardly expanding interior exit portion forming a secondary annular Venturi in said exit portion, said conical center aerodynamically protecting the electro-generator from drag causing function.

References Cited

UNITED STATES PATENTS

| 1,312,021 | 8/1919 | Stark et al. | 290—55 |
| 2,379,857 | 7/1945 | Bakke | 290—44 |

FOREIGN PATENTS

| 540,347 | 4/1922 | France. | |

ORIS L. RADER, *Primary Examiner.*

G. SIMMONS, *Assistant Examiner.*